US011506812B1

(12) United States Patent
Jabr et al.

(10) Patent No.: US 11,506,812 B1
(45) Date of Patent: Nov. 22, 2022

(54) SYSTEMS AND METHOD FOR SELECTING A LOGGING DEPLOYMENT OPTION

(71) Applicant: Saudi Arabian Oil Company, Dhahran (SA)

(72) Inventors: Abdulla A. Jabr, Qatif (SA); Ahmed A. Alkhili, Alkhobar (SA); Mustapha Berkane, Dhahran (SA)

(*) Notice: Subject to any disclaimer, the term of this patent is extended or adjusted under 35 U.S.C. 154(b) by 0 days.

(21) Appl. No.: 17/398,410

(22) Filed: Aug. 10, 2021

(51) Int. Cl.
*G01V 11/00* (2006.01)

(52) U.S. Cl.
CPC ................................. *G01V 11/002* (2013.01)

(58) Field of Classification Search
CPC ..................................................... G01V 11/002
See application file for complete search history.

(56) References Cited

U.S. PATENT DOCUMENTS

| 7,172,037 | B2 | 2/2007 | Dashevskiy et al. |
| 9,022,140 | B2 | 5/2015 | Marx et al. |
| 9,598,947 | B2 | 3/2017 | Wang et al. |
| 10,301,923 | B2 | 5/2019 | Andresen et al. |
| 10,309,210 | B2 | 6/2019 | Abbassian et al. |
| 10,579,231 | B1 | 3/2020 | Valleru et al. |

| 2007/0185696 | A1 | 8/2007 | Moran et al. |
| 2011/0280104 | A1 | 11/2011 | McClung, III |
| 2014/0121972 | A1* | 5/2014 | Wessling .............. G01V 11/002 702/6 |

FOREIGN PATENT DOCUMENTS

| RU | 2723805 C1 | 6/2020 |
| WO | 2009058635 A2 | 5/2009 |

* cited by examiner

*Primary Examiner* — Mischita L Henson
(74) *Attorney, Agent, or Firm* — Dinsmore & Shohl, LLP (57) ABSTRACT

Systems and methods for selecting a logging deployment option are provided. One embodiment of a method includes providing a user interface that provides at least one user option regarding well data about a well, mud data about mud, and logging tools configuration data about logging tools at the well, receiving the well data about the well, the mud data about mud, and logging tools configuration data about logging tools at the well, and determining whether at least one of the well data, the mud data, or logging tools configuration data includes a trigger for determining a desired logging option. In response to determining that, at least one of the well data, the mud data, or logging tools configuration data includes a trigger for determining the desired logging option, selecting the desired logging option and providing the desired logging option for display.

20 Claims, 7 Drawing Sheets

FIG. 1

LOGGING OPTIONS

WELL DATA
- DIRECTIONAL SURVEY ☐
- MINIMUM RESTRICTION ☐
- DOWN HOLE TEMPERATURE ☐
- DOWN HOLE PRESSURE ☐
- FORMATION TYPE ☐
- HOLE SIZE ☐
- TRUE VERTICAL DEPTH ☐
- MEASURED DEPTH ☐

MUD DATA
- MUD TYPE ☐
- MUD WEIGHT ☐
- SOLIDS PERCENTAGE ☐
- VISCOSITY ☐
- ELECTRICAL STABILITY ☐
- SALINITY ☐

FIG. 7

SYSTEMS AND METHOD FOR SELECTING A LOGGING DEPLOYMENT OPTION

TECHNICAL FIELD

Embodiments described herein generally relate to systems and methods for selecting a logging deployment option and, more specifically, to embodiments for determining a desired logging procedure based on a predicted likelihood of success.

BACKGROUND

There are a plurality of different logging options currently in use to log features of a well. One of these current options includes wireline logging. Wireline logging includes utilizing electric instruments to continuously measure properties of a well and/or geological area that allow the operator to make decisions regarding drilling of the well. Using wireline to deploy logging tools is the preferred logging option, but may be difficult to implement in certain conditions.

Another deployment option for logging tools is the pipe conveyed logging. Pipe conveyed logging may include techniques for gathering down-hole data while drilling, but without the removing drill pipe from the well. Pipe conveyed logging may be implemented when wireline operations are not feasible, such as in high angle/horizontal wells.

While these two deployment options are described herein, others may also be utilized. However, regardless of the deployment options being considered, the decision on which deployment option to choose is currently problematic. Current solutions typically include an operator guessing the best logging option based on his/her experience and personal prioritization of estimated well characteristics. These current solutions result in sub-optimal deployment decision making, leading to an increased cost, failures, and operation times. Further, expensive logging tools may be deployed when such tools are not needed. As such, a need exists in the industry.

SUMMARY

Systems and methods for selecting a logging deployment option are described. One embodiment of a method includes providing a user interface that provides at least one user option regarding well data about a well, mud data about mud at the well, or logging tools configuration data about logging tools at the well, receiving the well data about the well, the mud data about the mud at the well, or logging tools configuration at the well, to determining whether at least one of the well data, the mud data, or logging tools configuration data includes a trigger for determining a desired logging option. In response to determining that at least one of the well data, the mud data, or logging tools configuration data includes a trigger for determining the desired deployment logging option, selecting the desired logging option and providing the desired logging option for display.

In another embodiment, a system includes a computing device with a processor and a memory component. The memory component stores logic that, when executed by the processor, causes the system to provide a user interface that provides at least one user option regarding well data about a well, mud data about mud at the well, and/or logging tools configuration data about logging tools at the well, receive the well data, the mud data, and/or logging tools configuration data, and determine whether at least one of the well data, the mud data, or logging tools configuration data includes a trigger for determining a desired deployment logging option. In some embodiments, in response to determining that at least one of the well data, the mud data and logging tools configuration data includes the trigger for determining the desired deployment logging option, the logic may cause the system to select the desired deployment logging option and provide the desired deployment logging option for display. In response to determining that the at least one of the well data, the mud data, or logging tools configuration data does not include the trigger for determining the desired deployment logging option, the logic may cause the system to make a comparison of the well data and the mud data to historical data, determine from the comparison the desired deployment logging option, and provide the desired deployment logging option for display. In some embodiments, the logic causes the system to determine a likelihood of getting the desired logging option stuck in the well, a likelihood of a good quality logging using the desired deployment logging option, and a likelihood of success with the desired deployment logging option and provide the likelihood of getting the desired deployment logging option stuck in the well, the likelihood of a good quality logging using the desired deployment logging option, and a likelihood of success with the desired deployment logging option. In some embodiments, the logic causes the system to determine outcome data related to the deployment logging option, wherein the outcome data includes at least one of the following: stuck incident status data related to whether the desired deployment logging option became stuck in the well, whether quality data related to whether the logging was a good quality, and success data related to whether the logging was a success; and store the outcome data, the well data, the mud data, and the desired deployment logging option for future use.

In yet another embodiment, a non-transitory computer-readable medium includes logic that causes a computing device to provide a user interface that provides at least one user option regarding well data about a well, mud data about mud at the well, and/or logging tools configuration data about logging tools at the well, receive the well data, the mud data, and logging tools configuration data, and determine whether at least one of the well data, the mud data or logging tools configuration data includes a trigger for determining a desired deployment logging option. In response to determining that at least one of the well data, the mud data or logging tools configuration data includes the trigger for determining the desired deployment logging option, the logic may cause the computing device to select the desired logging option and provide the desired logging option for display. In response to determining that the at least one of the well data, the mud data or logging tools configuration data does not include the trigger for determining the desired deployment logging option, the logic may cause the computing device to make a comparison of at least one of the well data, the mud data or logging tools configuration data to historical data, determine from the comparison the desired deployment logging option, and provide the desired logging option for display. In some embodiments, the logic may cause the computing device to determine a likelihood of getting the desired deployment logging option stuck in the well, a likelihood of a good quality logging using the desired deployment logging option, and a likelihood of success with the desired deployment logging option and provide the likelihood of getting the desired logging option stuck in the well, the likelihood of a good quality logging using the desired deployment logging option, and a likelihood of success with the desired deployment logging option. In some embodiments, the logic causes the computing device to determine outcome data related to the deployment logging configuration, wherein the outcome data includes at least one of the following: stuck incident status data related to whether the desired deployment logging option became stuck in the well, whether quality data related to whether the deployment logging configuration was a good quality, and success data related to whether the deployment logging configuration was a success and store the outcome data, the well data, the mud data, and the desired deployment logging option for future use.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for selecting a logging deployment option. Some embodiments relate to the decision-making process for selecting a logging deployment option (such as pipe conveyed logging, wireline logging or logging while drilling) by incorporating statistical analysis, machine learning and artificial intelligence, and predicting a likelihood of success for the selected logging deployment option.

Historical and future logging data may be imported that allows retrieving and processing logging runs to derive insights about success data and failure rates. The deployment logging data may include but not limited to well data, such as directional survey data, minimum restriction data, down hole temperature data, formation type data, formation pressure data, hydrostatic pressure data, hole size data, true vertical depth data, and/or measured depth data; mud data, such as mud type, mud weight, solids percentage, viscosity, electrical stability, and/or salinity; logging tool data, such as deployment method data, length data, internal diameter data, outside diameter data, mechanical properties data, log type data, and/or service provider data; and/or logging outcome data, such as captured logs quality data, duration of operation data, duration of sampling data, suck incident status data, maximum tension while logging data, effectiveness of safety measures, retrieved tools data and/or left tools data.

Some embodiments may derive insights by using applied statistics and probability on the logging data. Further, some embodiments are configured to match wells to be logged with previously logged wells that have similar attributes (e.g., deviation, overbalance, mud type, etc.). Based on this information, these embodiments determine a desired deployment option and a logging tool configuration option.

Some embodiments determine a reason that that previous logging deployments failed (such as due to external conditions such as human error or well stability issues) and may factor the reason for failure of these past events when predicting success of future operations. These embodiments start from the outcome and go back to deduce the root cause (well, mud and logging tools, etc.) that lead to that outcome.

Getting stuck is not a desirable outcome in any logging run. The incidents become more adverse if logging tools containing radioactive material are involved. To understand why and when a logging run gets stuck, embodiments provided herein will review wells where stuck incidents took place and perform sensitivity analysis. From this analysis, it has been determined that lubrication agents used as mud additives or based on the nature of the oil base mud are a favorable medium for logging operations in order to prevent stickiness.

Similarly, small size holes (e.g., about 5⅞ inches in diameter or smaller) have a propensity getting stuck. For wells with oil base mud and holes size larger than about 6⅛ inches, stuck incidents represent an insignificant percentage.

Depending on Logging tool requirements, service providers might request mud salinity to be maintained below a predetermined threshold (e.g., about 100,000 ppm). Changing mud salinity to lower values may lead to chemical reaction and/or ion exchange that damages the wellbore. Embodiments described herein may be configured to observe the mud salinity that leads to log qualities that are not acceptable. Depending on multiple factors, these embodiments may determine an acceptable mud salinity to protect the hardware, while maintaining the quality. Further a sensitivity analysis may lead to the conclusion that down hole temperature and/or down hole pressure are major contributor to log quality.

Furthermore, the average time it takes to perform same logging runs using different deployment methods can be compared to determine the most efficient deployment method under pre-specified conditions. In some embodiments, if/then statements may be utilized by the artificial intelligence engine to make these predictions. As an example, a user may input that down hole temperature is 310° F. The computing device may determine that wells with temperatures greater than 300° F. have low quality logs. A recommendation may be provided that the image log is not obtainable due to high temperature. The recommendation may additionally be made to abort the log. The systems and methods for selecting a logging deployment option incorporating the same will be described in more detail, below.

Figure 1:
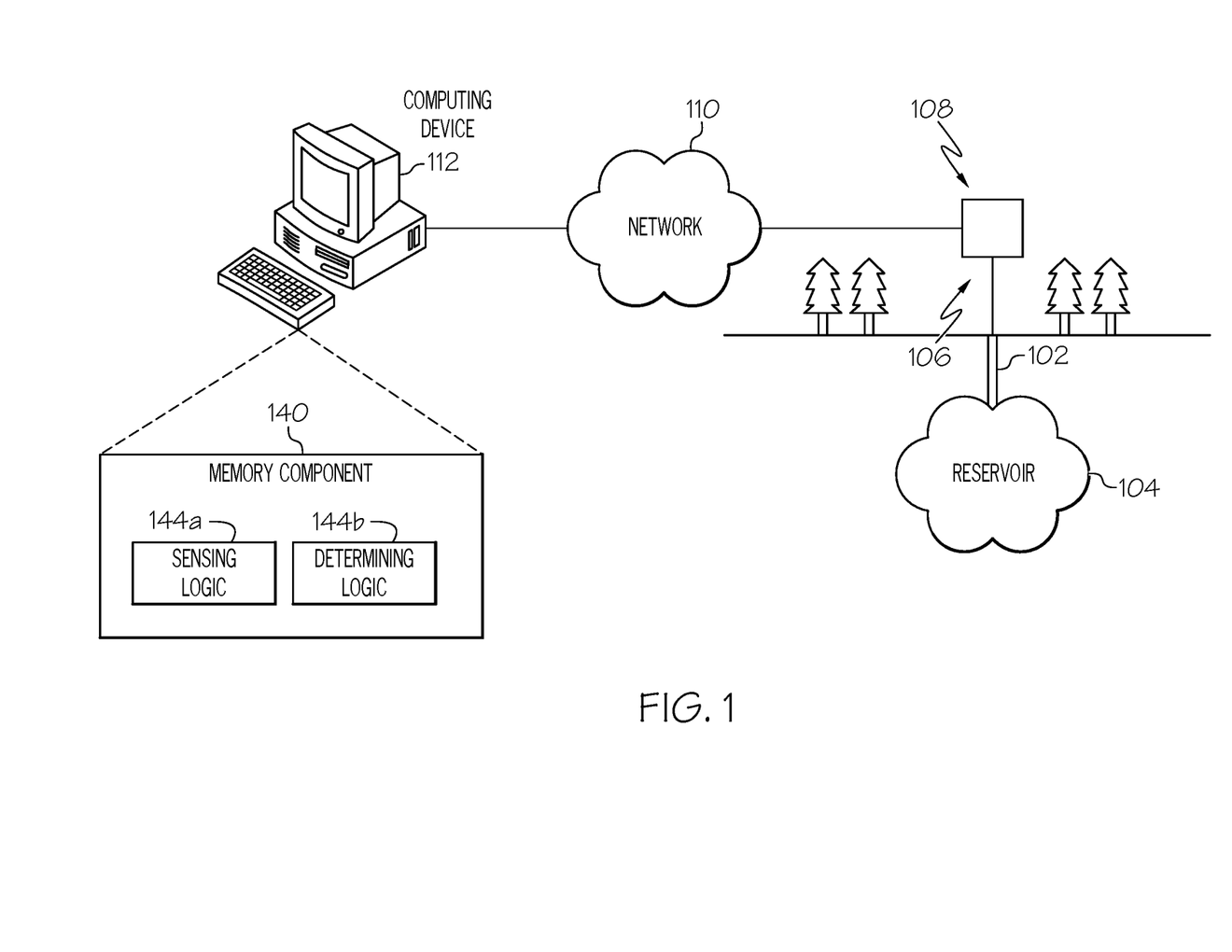
FIG. 1 depicts a computing environment for selecting a logging deployment option, according to embodiments provided herein.

Referring now to the drawings, FIG. 1 depicts a computing environment for selecting a logging deployment option, according to embodiments provided herein. As illustrated, the drilling environment includes a well 102 that has been drilled into a reservoir 104 and receives a logging tool 106.

While many current solutions merely guess at which logging deployment and/or tool to use, embodiments provided herein may be configured to predict a likelihood of success with one or more different logging tools and provide a recommended logging tool configuration, based on the data received. As discussed in more detail below, embodiments may receive this data via user input and/or via sensor output from a sensor 108.

A network 110 may be coupled to the logging tool 106 and/or the sensor 108 to communicate data with a computing device 112. The network 110 may be configured as any wide area network (such as PSTN, mobile network, the internet, satellite network, etc.), local network (such as wireless fidelity, local area network, etc.) and/or any peer to peer network (such as a ZigBee, near field communication, a wired connection, etc.). The computing device 112 may include any personal computer, server, tablet, mobile computing device, dedicated computing device, etc. for performing the functionality provided herein. As such, the computing device 112 includes a memory component 140 that stores sensing logic 144a and determining logic 144b. The sensing logic 144a may be configured to cause the computing device 112 to interpret signals from the sensor 108. The determining logic 144b may cause the computing device 112 to utilize that data to determine predict a likelihood of success for one or more logging tools, as described in more detail below.

It should be understood that while sensor 108 is depicted in FIG. 1 as a single sensor, this is one embodiment. The sensor 108 may represent any of a plurality of different sensors for detecting temperature, pressure, salinity, length, depth, mud type, weight, viscosity, solids, electrical stability, etc.

Figure 2:
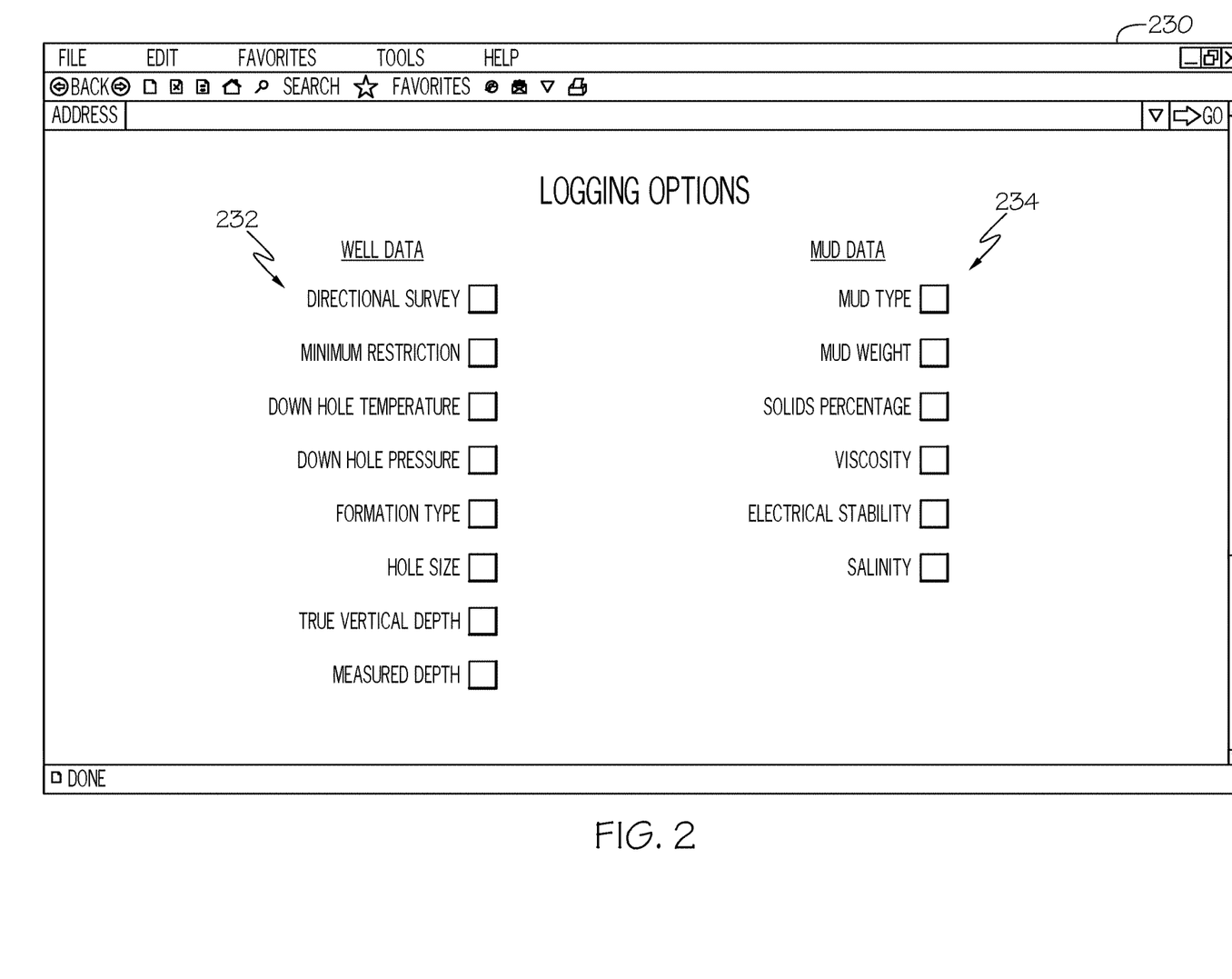
FIG. 2 depicts a user interface for selecting a logging deployment option, according to embodiments provided herein.

FIG. 2 depicts a user interface 230 for selecting a logging deployment option, according to embodiments provided herein. As illustrated, the user interface 230 includes various logging options that may be detected and/or input by a user. These logging options include well data 232 and mud data 234. The well data 232 may include directional survey data, minimum restriction data, down hole temperature data, down hole pressure data, formation type data, hole size data, true vertical depth data, and/or measured depth data. The mud data 234 may include mud type data, mud weight data, solids percentage data, viscosity data, electrical stability data, and/or salinity data.

As discussed above, embodiments may be configured such that the user may manually input one or more of these pieces of data. Similarly, some embodiments may be configured such that the sensor 108 is deployed to detect this data. It should also be understood that while embodiments may utilize all of this requested data, some embodiments may be configured to utilize a portion of this data for making the predictions. As an example, if salinity cannot be accurately determined, embodiments may predict a success rate without that data. In some embodiments, predictions may be made by substituting missing data with a top end value (e.g., the highest value encountered in other wells), a low end value (e.g., the lowest value encountered in other wells), an average value from other wells, a median value from other wells, etc.

Figure 3:
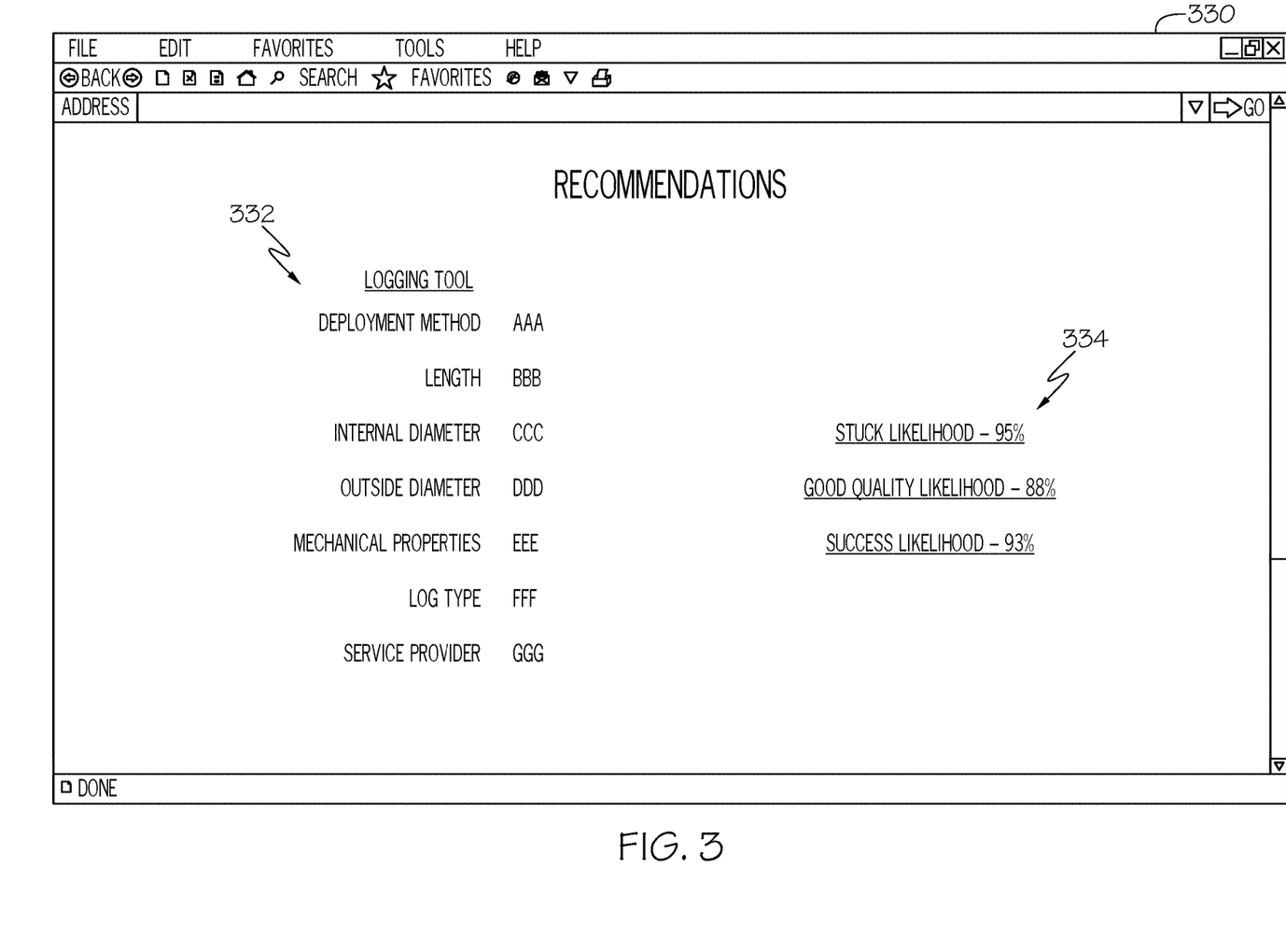
FIG. 3 depicts a user interface for providing recommendations for a desired deployment logging option, according to embodiments provided herein.

FIG. 3 depicts a user interface 330 for providing recommendations for a desired logging option, according to embodiments provided herein. As illustrated, embodiments provided herein may receive the data via the user interface 230 (FIG. 2) and may predict a recommended logging tool 106 for this particular well 102. Specifically, embodiments may be configured to determine a trigger in the data received. As an example, embodiments may analyze past wells to determine strong commonalities regarding successful and unsuccessful logging. If, for example, wireline logging is always (or at least above a predetermine threshold for success) successful with oil-based mud, oil-based mud may be a trigger. Such that when a next well 102 is analyzed, if the well 102 is primarily oil-based mud, the trigger may strongly suggest the use of wireline logging. Similarly, if a hole size below a predetermined size or clearance always (or at least above a predetermined threshold) results in a stuck logging tool 106 using wireline logging, if the current well 102 has that hole size or clearance, the trigger may indicate that wireline logging should not be used.

If a trigger condition is not met, the embodiments may predict logging tool data 332 that, based on the information received, will likely result in a successful logging. The tool characteristics may include a deployment method, a length, an internal diameter, an outside diameter, a mechanical property, a log type, a friction reduction technology and/or a service provider. It should also be understood that in addition to determining the logging tool data 332 that are most likely to be successful for this particular well 102, embodiments may also cross check available tools to determine if there is an available tool that meets the logging tool data 332. If so, the recommendation may be provided in the user interface 330. If there is not an available tool, embodiments may determine an available tool that is closest to the recommended logging tool 106 and/or will provide the best chance for success.

Also provided in the user interface 330 is a success prediction section 334 that provides a likelihood of a stuck logging tool 106, a likelihood of a good quality logging, and a success likelihood. While these predictions may be similar, the stuck likelihood predicts a likelihood of a particular type of fault that could occur. As such, the stuck likelihood may consider hole size, mud type, deployment technology being used and/or other factors from FIG. 2 that would increase or decrease the probability that the logging tool 106 could become stuck. The good quality likelihood may represent a probability that the logging will be of a predetermined level of quality once the logging tool 106 is deployed. Stated another way, even if the logging tool 106 is not stuck, quality issues in terms of data collection could arise. The overall success likelihood represents both likelihood that the logging tool 106 will not get stuck and that the log will be a high quality log.

Figure 4:
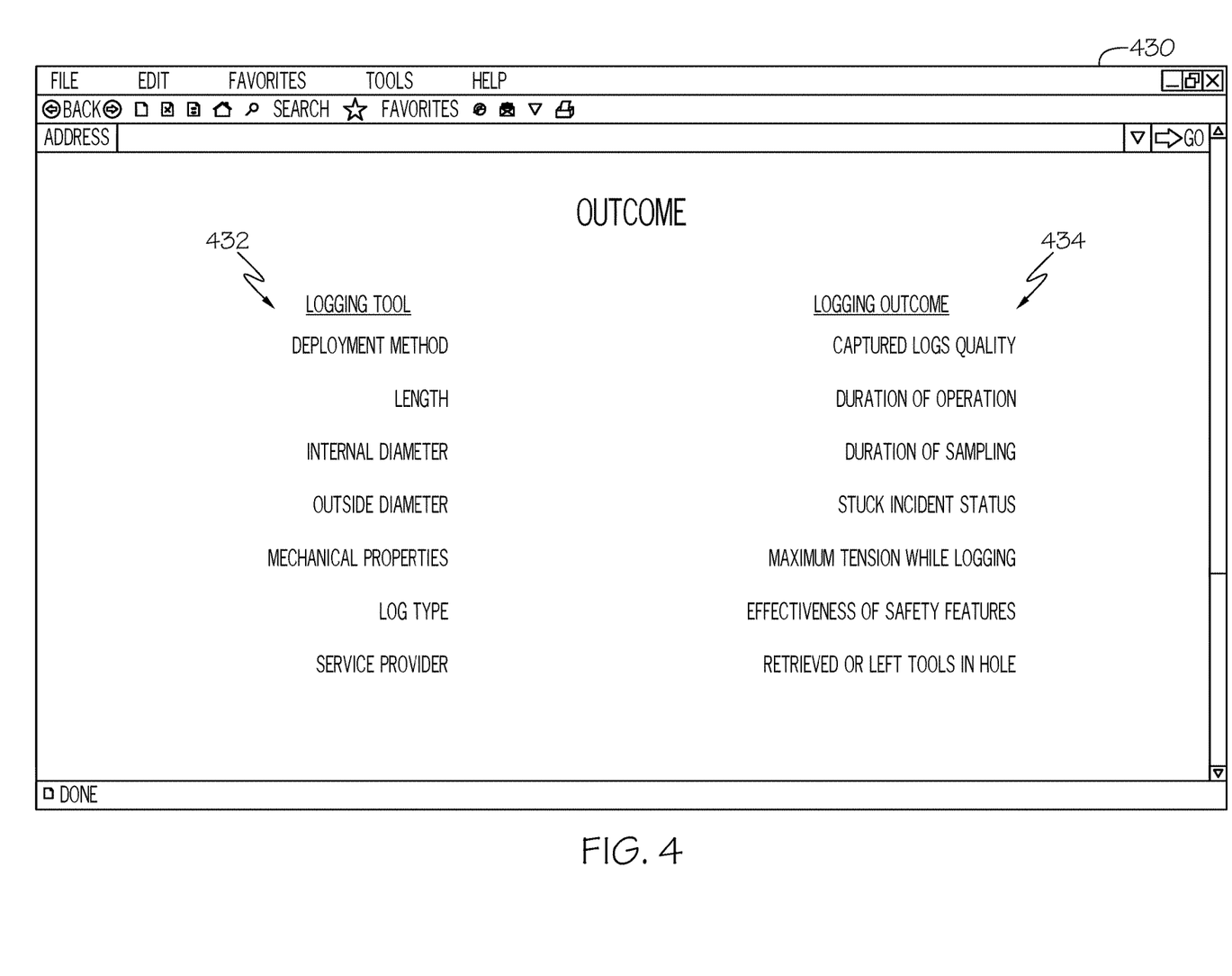
FIG. 4 depicts a user interface for providing an outcome for a desired deployment logging option, according to embodiments provided herein.

FIG. 4 depicts a user interface 430 for providing an outcome for a desired logging option, according to embodiments provided herein. As illustrated, embodiments may be configured to measure (such as via the sensor 108) and/or receive data related to the results of a log. The user interface 430 may then provide data, such as logging tool data 432 and logging outcome data 434. The logging tool data 432 may be similar to the logging tool data 332 from FIG. 3. However, the logging tool data 332 from FIG. 3 is associated with a recommended tool, whereas, the logging tool data 432 relates to the tool that was actually used. As such, the logging tool data 332 and the logging tool data 432 may or may not be the same.

The logging outcome data 434 may provide results of the log. Specifically, the logging outcome data 434 may include captured logs quality data, duration of operation data, duration of sampling data, stuck incident status data, maximum tension while logging data, effectiveness of safety features data, and/or retrieved or left tools in hole. This data may additionally be compared to the prediction as well 102 as other historical data to determine whether the prediction was within an acceptable tolerance of the outcome. If so, the computing device 112 may learn to reinforce this portion of the prediction. If the prediction is not within a predetermined tolerance, alterations may be made to weigh different criteria more heavily.

Some embodiments may also be configured to predict a first time it takes to log the well 102 using the desired logging option and predict a second time it takes to log the well 102 using a different logging deployment. Some embodiments may compare the first time to the second time to determine a more efficient logging deployment.

Figure 5:
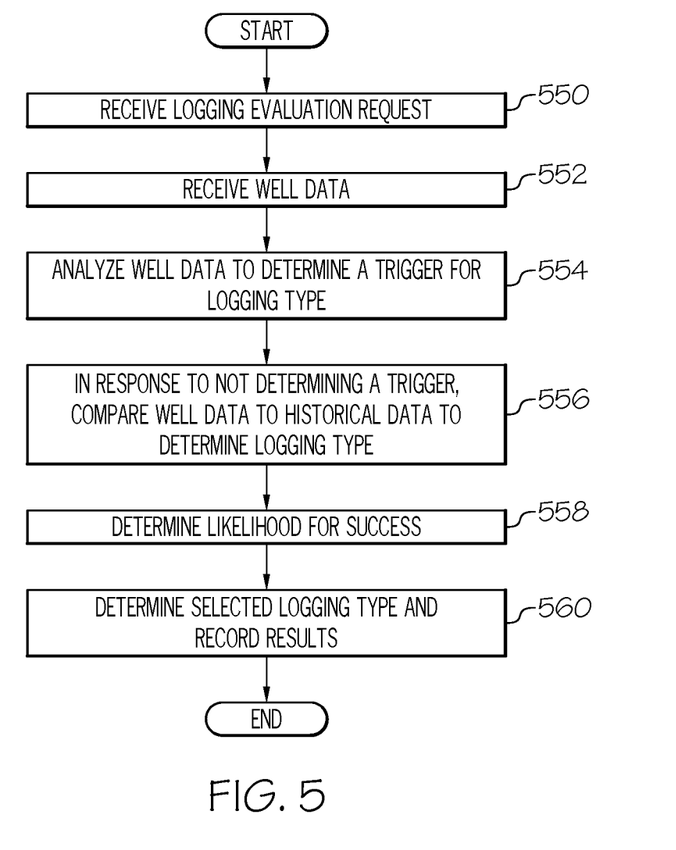
FIG. 5 depicts a flowchart for selecting a logging deployment option, according to embodiments provided herein.

FIG. 5 depicts a flowchart for selecting a logging deployment option, according to embodiments provided herein. As illustrated in block 550, a logging evaluation request may be received. In block 552, well data 232 may be received. As discussed above, the well data 232 may be received from a user and/or a sensor 108. In block 554, the well data 232 may be analyzed to determine a trigger for logging type. In block 556, in response to not determining a trigger, well data 232 may be compared to historical data to determining a logging type. In block 558 a likelihood of success may be predicted. In block 560 a logging type may be selected and results recorded.

Figure 6:
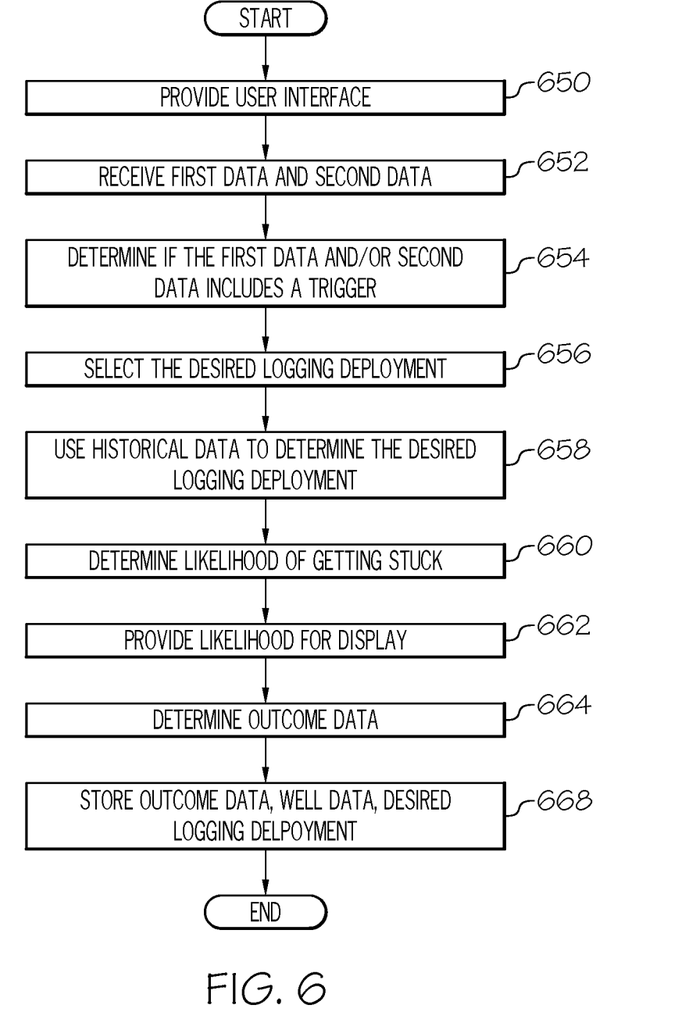
FIG. 6 depicts another flowchart for selecting a logging deployment option, according to embodiments provided herein.

FIG. 6 depicts another flowchart for selecting a logging deployment option, according to embodiments provided herein. As illustrated in block 650, a user interface may be provided that includes at least one user option regarding well data 232 about a well 102 and mud data 234 about mud at the well 102. In block 652, the well data 232 about the well 102 and the mud data 234 about the mud at the well 102 may be received. In block 654, a determination may be made regarding whether at least one of the well data 232 or the mud data 234 includes a trigger for determining a desired logging option. In block 656, in response to determining that at least one of the well data 232 or the mud data 234 includes a trigger for determining the desired logging option, the desired logging option may be selected and the desired logging option may be provided for display. In block 658, in response to determining that the at least one of the well data 232 or the mud data 234 does not include a trigger for determining the desired logging option a comparison of the well data 232 and the mud data 234 may be made to historical data; a determination may be made of the desired logging option from the comparison; and the desired logging option may be provided for display. In block 660, a likelihood of getting the desired logging option stuck in the well 102, a likelihood of a good quality logging using the desired logging option, and a likelihood of success with the desired logging option may be determined. In block 662, the likelihood of getting the desired logging option stuck in the well 102, the likelihood of a good quality logging using the desired logging option, and the likelihood of success with the desired logging option may be provided. In block 664 a determination of outcome data related to the logging may be made, where the outcome data includes data related to whether the desired logging option became stuck in the well 102, whether the logging was a good quality, and whether the logging was a success. In block 668, the outcome data, the well data 232, the mud data 234, and the desired logging option may be stored for future use.

Figure 7:
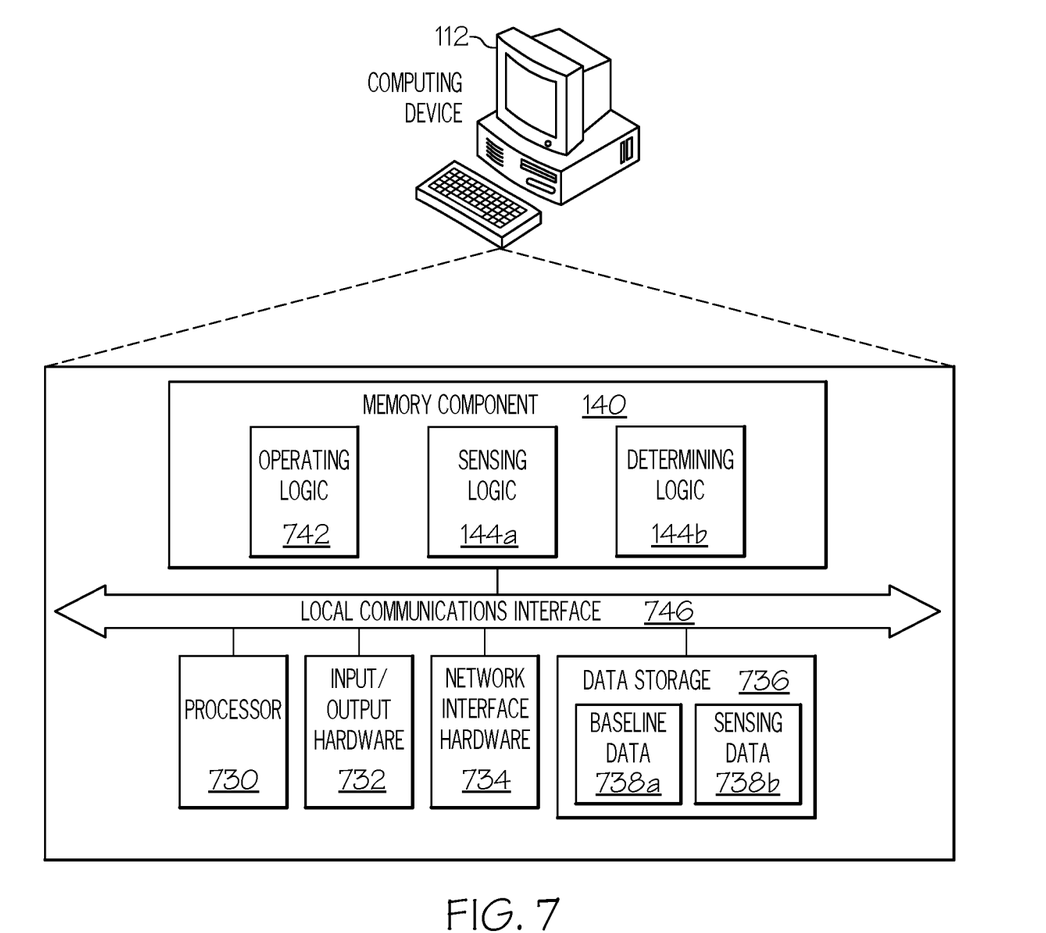
FIG. 7 depicts a computing device for selecting a logging deployment option, according to embodiments provided herein.

FIG. 7 depicts a computing device 112 for selecting a logging deployment option, according to embodiments provided herein. As illustrated, the computing device 112 includes a processor 730, input/output hardware 732, a network interface hardware 734, a data storage component 736 (which stores baseline data 738a, sensing data 738b, and/or other data), and a memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable mediums. Depending on the particular embodiment, these non-transitory computer-readable mediums may reside within the computing device 112 and/or external to the computing device 112.

The memory component 140 may store operating logic 742, the sensing logic 144a, and the determining logic 144b. Each of these logic components may include a plurality of different pieces of logic, each of which may be embodied as a computer program, firmware, and/or hardware, as an example. A local interface 746 is also included in FIG. 7 and may be implemented as a bus or other communication interface to facilitate communication among the components of the computing device 112.

The processor 730 may include any processing component operable to receive and execute instructions (such as from a data storage component 736 and/or the memory component 140). As described above, the input/output hardware 732 may include and/or be configured to interface with speakers, microphones, and/or other input/output components.

The network interface hardware 734 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the computing device 112 and other computing devices.

The operating logic 742 may include an operating system and/or other software for managing components of the computing device 112. As discussed above, the sensing logic 144a may reside in the memory component 140 and may be configured to cause the processor 730 to interpret signals from the sensor 108. The determining logic 144b may be configured to cause the processor 730 to utilize the data from the sensing logic 144a to likelihood of success for a desired logging option (as well as provide other functionality provided herein).

It should be understood that while the components in FIG. 7 are illustrated as residing within the computing device 112, this is merely an example. In some embodiments, one or more of the components may reside external to the computing device 112 or within other devices. It should also be understood that, while the computing device 112 is illustrated as a single device, this is also merely an example. In some embodiments, the sensing logic 144a and the determining logic 144b may reside on different devices.

Additionally, while the computing device 112 is illustrated with the sensing logic 144a and the determining logic 144b as separate logical components, this is also an example. In some embodiments, a single piece of logic may provide the described functionality. It should also be understood that while the sensing logic 144a and the determining logic 144b are described herein as the logical components, this is also an example. Other components may also be included, depending on the embodiment.

One or more aspects of the present disclosure are described herein. A first aspect of the present disclosure may include method for selecting a logging deployment option, comprising: providing, by a computing device, a user interface that provides at least one user option regarding well data about a well, mud data about mud, and logging tools configuration data about logging tools at the well; receiving, by the computing device, the well data about the well, the mud data about mud and the logging tools configuration data about logging tools at the well; determining, by the computing device, whether at least one of the well data, the mud data, or logging tools configuration data includes a trigger for determining a desired logging option; in response to determining that at least one of the data, the mud data, or logging tools configuration data includes the trigger for determining the desired logging option, selecting, by the computing device, the desired logging option and providing, by the computing device, the desired logging option for display; in response to determining that the at least one of the well data, the mud data, or logging tools configuration data does not include the trigger for determining the desired logging option, making, by the computing device, a comparison of the well data, the mud data, or logging tools configuration data to historical data, determining from the comparison, by the computing device, the desired logging option, and providing, by the computing device, the desired logging option for display; determining, by the computing device, a likelihood of getting the desired logging option stuck in the well, a likelihood of a good quality logging using the desired logging option, and a likelihood of success with the desired logging option; providing, by the computing device, the likelihood of getting the desired logging option stuck in the well, the likelihood of a good quality logging using the desired logging option, and a likelihood of success with the desired logging option; determining, by the computing device, outcome data related to the logging, wherein the outcome data includes stuck incident status data related to whether the desired logging option became stuck in the well, quality data related to whether the logging was a good quality, and success data related to whether the logging was a success; and storing, by the computing device, the outcome data, the well data, the mud data, and the desired logging option for future use.

A second aspect includes the first aspect, wherein the well data includes at least one of the following: directional survey data, minimum restriction data, down hole temperature data, down hole pressure data, formation type data, hole size data, true vertical depth data, or measured depth data.

A third aspect includes the first aspect and/or the second aspect, wherein the mud data includes at least one of the following: mud type data, mud weight data, solids percentage data, viscosity data, electrical stability data, or salinity data.

A fourth aspect includes any of the first aspect through the third aspect, further comprising determining logging data related to the desired logging, wherein the logging data related to the desired logging option includes at least one of the following: a deployment method, a length of the desired logging option, an internal diameter of the desired logging option, an outside diameter of the desired logging option, a mechanical property of the desired logging option, a friction reduction technology option, a log type, or a service provider.

A fifth aspect includes any of the first aspect through the fourth aspect, wherein the outcome data includes at least one of the following: captured logs quality data, duration of operation data, duration of sampling data, stuck incident status data, maximum tension while logging data, effectiveness of safety measures data, retrieved tools data or left tools data. Root cause data for stuck tools.

A sixth aspect includes any of the first aspect through the fifth aspect, further comprising performing a sensitivity analysis of the well.

A seventh aspect includes any of the first aspect through the sixth aspect, further comprising: predicting a first time it takes to log the well using the desired logging option; predicting a second time it takes to log the well using a different logging deployment; and comparing the first time to the second time to determine a more efficient logging deployment.

An eighth aspect includes a system for selecting a logging deployment option, comprising: a computing device that includes a processor and a memory component, wherein the memory component stores logic that, when executed by the processor, causes the system to perform at least the following: provide a user interface that provides at least one user option regarding well data about a well and mud data about mud at the well; receive the well data and the mud data; determine whether at least one of the well data, the mud data, or logging tools configuration data includes a trigger for determining a desired logging option; in response to determining that at least one of the well data, the mud data, or logging tools configuration data includes the trigger for determining the desired logging option, select the desired logging option and provide the desired logging option for display; in response to determining that the at least one of the well data, the mud data, or logging tools configuration data does not include the trigger for determining the desired logging option, make a comparison of the well data, the mud data, or logging tools configuration data to historical data, determine from the comparison the desired logging option, and provide the desired logging option for display; determine a likelihood of getting the desired logging option stuck in the well, a likelihood of a good quality logging using the desired logging option, and a likelihood of success with the desired logging option; provide the likelihood of getting the desired logging option stuck in the well, the likelihood of a good quality logging using the desired logging option, and a likelihood of success with the desired logging option; determine outcome data related to the logging, wherein the outcome data includes at least one of the following: stuck incident status data related to whether the desired logging option became stuck in the well, whether quality data related to whether the logging was a good quality, and success data related to whether the logging was a success; and store the outcome data, the well data, the mud data, and the desired logging option for future use.

A ninth aspect includes the eighth aspect, wherein the well data includes at least one of the following: directional survey data, minimum restriction data, down hole temperature data, down hole pressure data, formation type data, hole size data, true vertical depth data, or measured depth data.

A tenth aspect includes the eighth aspect and/or the ninth aspect, wherein the mud data includes at least one of the following: mud type data, mud weight data, solids percentage data, viscosity data, electrical stability data, or salinity data.

An eleventh aspect includes any of the eighth aspect through the tenth aspect, wherein the logic further causes the system to determine logging data related to the desired logging, wherein the logging data related to the desired logging option includes at least one of the following: a deployment method, a length of the desired logging option, an internal diameter of the desired logging option, an outside diameter of the desired logging option, a mechanical property of the desired logging option, a friction reduction technology option, a log type, or a service provider.

A twelfth aspect includes any of the eighth aspect through the eleventh aspect, wherein the outcome data includes at least one of the following: a captured logs quality, a duration of operation, a duration of sampling, a stuck incident status data, a maximum tension while logging, an effectiveness of safety measures, or a retrieved or left tools.

A thirteenth aspect includes any of the eighth aspect through the twelfth aspect, wherein the logic further causes the system to perform a sensitivity analysis of the well.

A fourteenth aspect includes any of the eighth aspect through the thirteenth aspect, wherein the logic further causes the system to perform at least the following: predict a first time it takes to log the well using the desired logging option; predict a second time it takes to log the well using a different logging deployment; and compare the first time to the second time to determine a more efficient logging deployment.

A fifteenth aspect includes a non-transitory computer-readable medium that stores logic that, when executed by a computing device, causes the computing device to perform at least the following: provide a user interface that provides at least one user option regarding well data about a well and mud data about mud at the well; receive the well data and the mud data; determine whether at least one of the well data or the mud data includes a trigger for determining a desired logging option; in response to determining that at least one of the well data or the mud data includes the trigger for determining the desired logging option, select the desired logging option and provide the desired logging option for display; in response to determining that the at least one of the well data, the mud data, or logging tools configuration data does not include the trigger for determining the desired logging option, make a comparison of at least one of the well data, the mud data, or logging tools configuration data to historical data, determine from the comparison the desired logging option, and provide the desired logging option for display; determine a likelihood of getting the desired logging option stuck in the well, a likelihood of a good quality logging using the desired logging option, and a likelihood of success with the desired logging option; provide the likelihood of getting the desired logging option stuck in the well, the likelihood of a good quality logging using the desired logging option, and a likelihood of success with the desired logging option; determine outcome data related to the logging, wherein the outcome data includes at least one of the following: stuck incident status data related to whether the desired logging option became stuck in the well, whether quality data related to whether the logging was a good quality, and success data related to whether the logging was a success; and store the outcome data, the well data, the mud data, and the desired logging option for future use.

A sixteenth aspect includes the fifteenth aspect, wherein the well data includes at least one of the following: directional survey data, minimum restriction data, down hole temperature data, down hole pressure data, formation type data, hole size data, true vertical depth data, or measured depth data.

A seventeenth aspect includes the fifteenth aspect and/or the sixteenth aspect, wherein the mud data includes at least one of the following: mud type data, mud weight data, solids percentage data, viscosity data, electrical stability data, or salinity data.

An eighteenth aspect includes any of the fifteenth aspect through the seventeenth aspect, wherein the logic further causes the computing device to determine logging data related to the desired logging, wherein the logging data related to the desired logging option includes at least one of the following: a deployment method, a length of the desired logging option, an internal diameter of the desired logging option, an outside diameter of the desired logging option, a mechanical property of the desired logging option, a friction reduction technology option, a log type, or a service provider.

A nineteenth aspect includes any of the fifteenth aspect through the eighteenth aspect, wherein the outcome data includes at least one of the following: a captured logs quality, a duration of operation, a duration of sampling, a stuck incident status data, a maximum tension while logging, an effectiveness of safety measures, or a retrieved or left tools.

A twentieth aspect includes any of the fifteenth aspect through the nineteenth aspect, wherein the logic further causes the computing device to perform at least the following: predict a first time it takes to log the well using the desired logging option; predict a second time it takes to log the well using a different logging deployment; and compare the first time to the second time to determine a more efficient logging deployment.

As illustrated above, various embodiments selecting a logging deployment option are disclosed. These embodiments provide for selection of a logging deployment using historical data, as well as prediction mechanisms for predicting a likelihood of success for one or more different logging options. This allows for more efficient and accurate logging deployments.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for selecting a logging deployment option. It should also be understood that these embodiments are merely exemplary and are not intended to limit the scope of this disclosure.

What is claimed is:

1. A method for selecting a logging deployment option, comprising:
providing, by a computing device, a user interface that provides at least one user option regarding well data about a well, mud data about mud, and logging tools configuration data about logging tools at the well;
receiving, by the computing device, the well data about the well, the mud data about mud and the logging tools configuration data about logging tools at the well;
determining, by the computing device, whether at least one of the well data, the mud data, or logging tools configuration data includes a trigger for determining a desired logging option;
in response to determining that at least one of the data, the mud data, or logging tools configuration data includes the trigger for determining the desired logging option, selecting, by the computing device, the desired logging option and providing, by the computing device, the desired logging option for display;
in response to determining that the at least one of the well data, the mud data, or logging tools configuration data does not include the trigger for determining the desired logging option, making, by the computing device, a comparison of the well data, the mud data, or logging tools configuration data to historical data, determining from the comparison, by the computing device, the desired logging option, and providing, by the computing device, the desired logging option for display;

determining, by the computing device, a likelihood of getting the desired logging option stuck in the well, a likelihood of a good quality logging using the desired logging option, and a likelihood of success with the desired logging option;

providing, by the computing device, the likelihood of getting the desired logging option stuck in the well, the likelihood of a good quality logging using the desired logging option, and a likelihood of success with the desired logging option;

determining, by the computing device, outcome data related to the logging, wherein the outcome data includes stuck incident status data related to whether the desired logging option became stuck in the well, quality data related to whether the logging was a good quality, and success data related to whether the logging was a success; and storing, by the computing device, the outcome data, the well data, the mud data, and the desired logging option for future use.

2. The method of claim 1, wherein the well data includes at least one of the following:
directional survey data, minimum restriction data, down hole temperature data, down hole pressure data, formation type data, hole size data, true vertical depth data, or measured depth data.

3. The method of claim 1, wherein the mud data includes at least one of the following:
mud type data, mud weight data, solids percentage data, viscosity data, electrical stability data, or salinity data.

4. The method of claim 1, further comprising determining logging data related to the desired logging, wherein the logging data related to the desired logging option includes at least one of the following: a deployment method, a length of the desired logging option, an internal diameter of the desired logging option, an outside diameter of the desired logging option, a mechanical property of the desired logging option, a friction reduction technology option, a log type, or a service provider.

5. The method of claim 1, wherein the outcome data includes at least one of the following: captured logs quality data, duration of operation data, duration of sampling data, maximum tension while logging data, effectiveness of safety measures data, retrieved tools data or left tools data.

6. The method of claim 1, further comprising performing a sensitivity analysis of the well.

7. The method of claim 1, further comprising:
predicting a first time it takes to log the well using the desired logging option;
predicting a second time it takes to log the well using a different logging deployment; and
comparing the first time to the second time to determine a more efficient logging deployment.

8. A system for selecting a logging deployment option, comprising:
a computing device that includes a processor and a memory component, wherein the memory component stores logic that, when executed by the processor, causes the system to perform at least the following:
provide a user interface that provides at least one user option regarding well data about a well and mud data about mud at the well;

receive the well data and the mud data;
determine whether at least one of the well data, the mud data, or logging tools configuration data includes a trigger for determining a desired logging option;
in response to determining that at least one of the well data, the mud data, or logging tools configuration data includes the trigger for determining the desired logging option, select the desired logging option and provide the desired logging option for display;
in response to determining that the at least one of the well data, the mud data, or logging tools configuration data does not include the trigger for determining the desired logging option, make a comparison of the well data, the mud data, or logging tools configuration data to historical data, determine from the comparison the desired logging option, and provide the desired logging option for display;
determine a likelihood of getting the desired logging option stuck in the well, a likelihood of a good quality logging using the desired logging option, and a likelihood of success with the desired logging option;
provide the likelihood of getting the desired logging option stuck in the well, the likelihood of a good quality logging using the desired logging option, and a likelihood of success with the desired logging option;
determine outcome data related to the logging, wherein the outcome data includes at least one of the following: stuck incident status data related to whether the desired logging option became stuck in the well, whether quality data related to whether the logging was a good quality, and success data related to whether the logging was a success; and
store the outcome data, the well data, the mud data, and the desired logging option for future use.

9. The system of claim 8, wherein the well data includes at least one of the following:
directional survey data, minimum restriction data, down hole temperature data, down hole pressure data, formation type data, hole size data, true vertical depth data, or measured depth data.

10. The system of claim 8, wherein the mud data includes at least one of the following:
mud type data, mud weight data, solids percentage data, viscosity data, electrical stability data, or salinity data.

11. The system of claim 8, wherein the logic further causes the system to determine logging data related to the desired logging, wherein the logging data related to the desired logging option includes at least one of the following: a deployment method, a length of the desired logging option, an internal diameter of the desired logging option, an outside diameter of the desired logging option, a mechanical property of the desired logging option, a friction reduction technology option, a log type, or a service provider.

12. The system of claim 8, wherein the outcome data includes at least one of the following: a captured logs quality, a duration of operation, a duration of sampling, a maximum tension while logging, an effectiveness of safety measures, or a retrieved or left tools.

13. The system of claim 8, wherein the logic further causes the system to perform a sensitivity analysis of the well.

14. The system of claim 8, wherein the logic further causes the system to perform at least the following:
predict a first time it takes to log the well using the desired logging option;

predict a second time it takes to log the well using a different logging deployment; and compare the first time to the second time to determine a more efficient logging deployment.

15. A non-transitory computer-readable medium that stores logic that, when executed by a computing device, causes the computing device to perform at least the following:

provide a user interface that provides at least one user option regarding well data about a well and mud data about mud at the well;

receive the well data and the mud data;

determine whether at least one of the well data or the mud data includes a trigger for determining a desired logging option;

in response to determining that at least one of the well data or the mud data includes the trigger for determining the desired logging option, select the desired logging option and provide the desired logging option for display;

in response to determining that the at least one of the well data, the mud data, or logging tools configuration data does not include the trigger for determining the desired logging option, make a comparison of at least one of the well data, the mud data, or logging tools configuration data to historical data, determine from the comparison the desired logging option, and provide the desired logging option for display;

determine a likelihood of getting the desired logging option stuck in the well, a likelihood of a good quality logging using the desired logging option, and a likelihood of success with the desired logging option;

provide the likelihood of getting the desired logging option stuck in the well, the likelihood of a good quality logging using the desired logging option, and a likelihood of success with the desired logging option;

determine outcome data related to the logging, wherein the outcome data includes at least one of the following: stuck incident status data related to whether the desired logging option became stuck in the well, whether quality data related to whether the logging was a good quality, and success data related to whether the logging was a success; and store the outcome data, the well data, the mud data, and the desired logging option for future use.

16. The non-transitory computer-readable medium of claim 15, wherein the well data includes at least one of the following: directional survey data, minimum restriction data, down hole temperature data, down hole pressure data, formation type data, hole size data, true vertical depth data, or measured depth data.

17. The non-transitory computer-readable medium of claim 15, wherein the mud data includes at least one of the following: mud type data, mud weight data, solids percentage data, viscosity data, electrical stability data, or salinity data.

18. The non-transitory computer-readable medium of claim 15, wherein the logic further causes the computing device to determine logging data related to the desired logging, wherein the logging data related to the desired logging option includes at least one of the following: a deployment method, a length of the desired logging option, an internal diameter of the desired logging option, an outside diameter of the desired logging option, a mechanical property of the desired logging option, a friction reduction technology option, a log type, or a service provider.

19. The non-transitory computer-readable medium of claim 15, wherein the outcome data includes at least one of the following: a captured logs quality, a duration of operation, a duration of sampling, a maximum tension while logging, an effectiveness of safety measures, or a retrieved or left tools.

20. The non-transitory computer-readable medium of claim 15, wherein the logic further causes the computing device to perform at least the following:

predict a first time it takes to log the well using the desired logging option;

predict a second time it takes to log the well using a different logging deployment; and compare the first time to the second time to determine a more efficient logging deployment.

* * * * *